Sept. 26, 1967 J. J. DEEGAN 3,343,392
SYSTEM FOR CONVERTING FORMING ROLLS TO ACCOMMODATE
VARIOUS SHELL DIAMETERS
Filed April 26, 1965 2 Sheets-Sheet 1
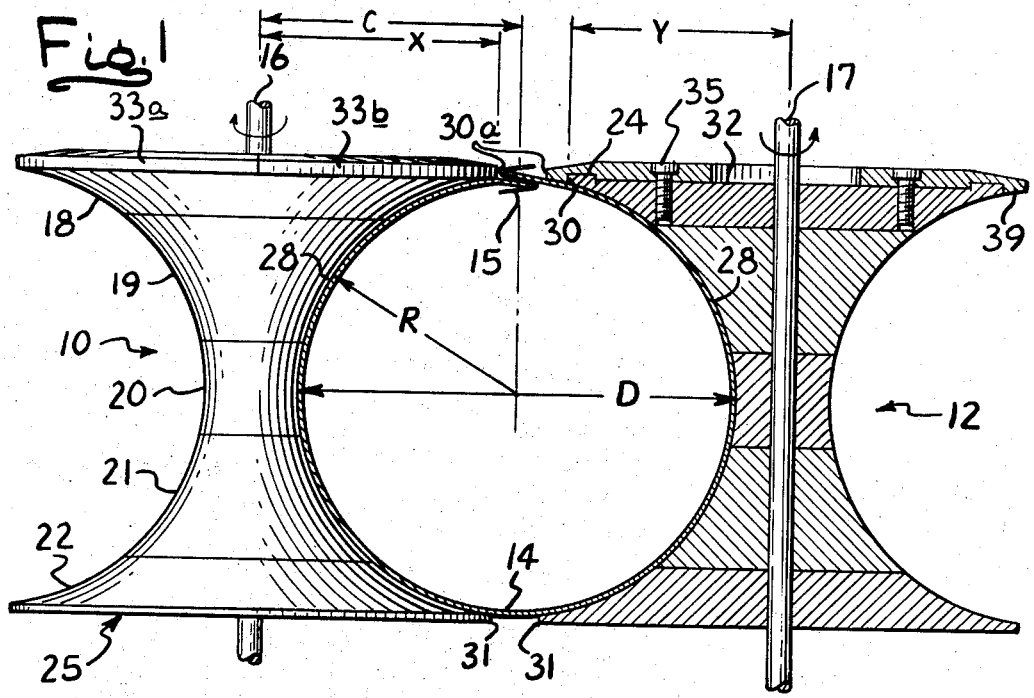
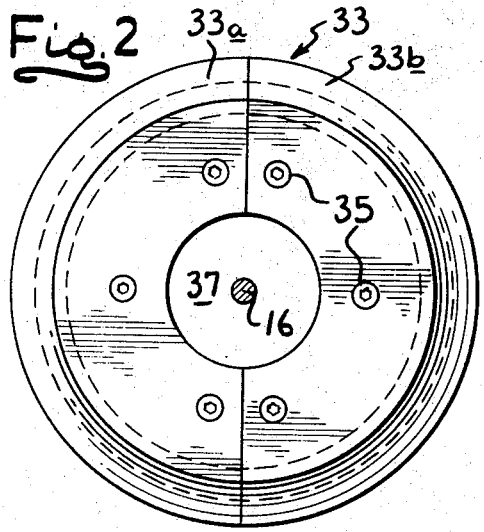
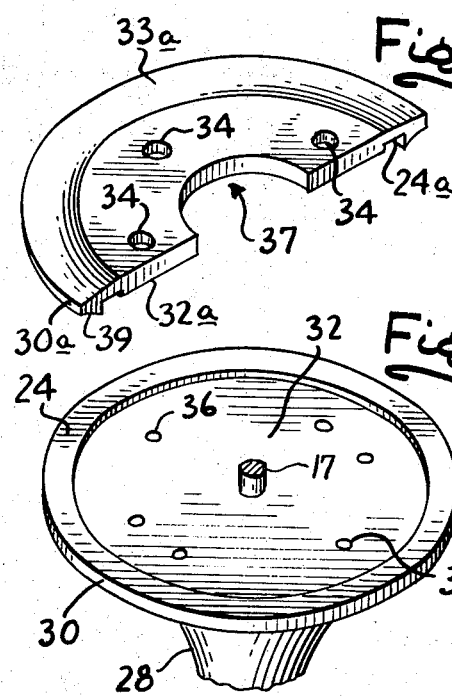
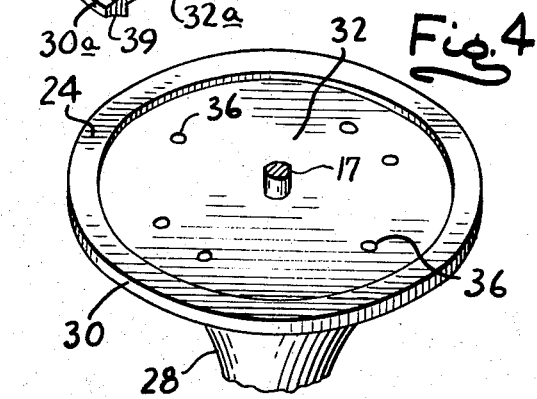
INVENTOR
JAMES J. DEEGAN
by: Wolfe, Hubbard, Voit & Osann
ATTYS.

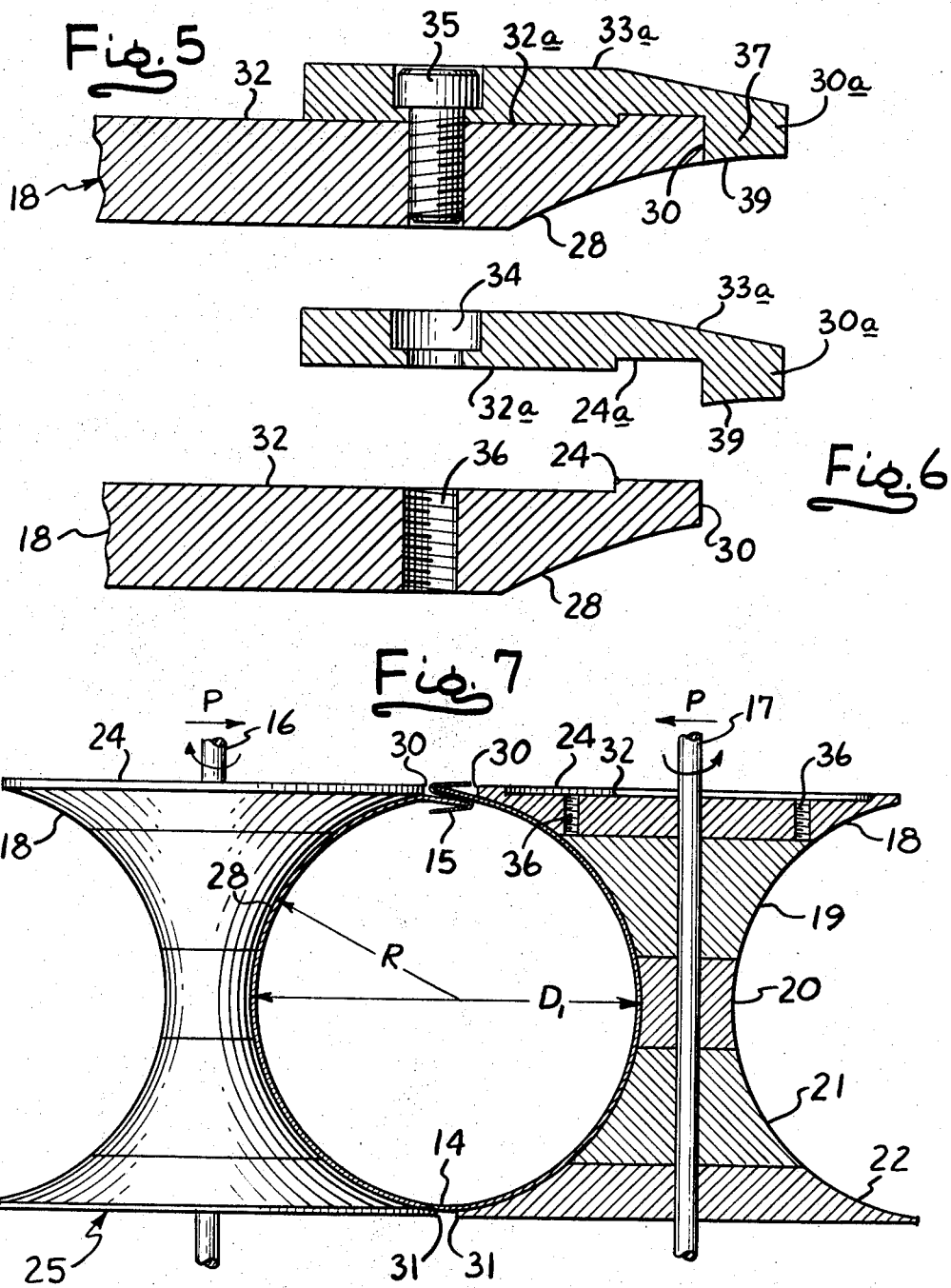

United States Patent Office 3,343,392
Patented Sept. 26, 1967

3,343,392
SYSTEM FOR CONVERTING FORMING ROLLS TO ACCOMMODATE VARIOUS SHELL DIAMETERS
James J. Deegan, La Grange Park, Ill., assignor to Inland Steel Company, Chicago, Ill., a corporation of Delaware
Filed Apr. 26, 1965, Ser. No. 450,956
13 Claims. (Cl. 72—182)

The present invention relates generally to forming rolls capable of pressing together edges of cylindrical sheet metal shells incident to performance of a welding operation and, more particularly, to improved methods and apparatus for converting forming rolls to accommodate differing shell diameters during a welding operation. In its principal aspect, the invention is concerned with improved methods and apparatus for converting forming rolls to accommodate various shell diameters wherein the conversion may be easily accomplished on an existing standard forming machine and which enables changeover to accommodate different shells with a minimum of machine down time.

In various industries, such, for example, as the container manufacturing industry, it has heretofore been the practice to utilize forming rolls which have radii equal or substantially equal to the radius of the shell fed therebetween for pressing the edges of the shell tightly into a Z-shaped strip, whereupon the welding operation can be performed to complete the container sidewall. When different diameter shells are to be manufactured, it has been common practice to change to different forming rolls having a radius which corresponds to the radius of the shells manufactured. As a practical matter, changing the rolls to accommodate a different diameter shell during welding requires long periods of machine down time which can be costly in mass production manufacturing operations. Moreover, changing the rolls themselves requires that different radii rolls be maintained and stored so as to be accessible for production line changes. Such rolls, in addition to being quite expensive, can be extremely bulky and heavy, especially where large diameter shells are being manufactured.

Accordingly, it is a general aim of the present invention to provide a forming roll conversion system which overcomes the disadvantages of having to change rolls to accommodate different diameter shells incident to performing the welding operation and which is characterized by its ability to permit easy and rapid changeover for different diameter shells with a minimum of machine down time. While not so limited in its application, the invention will find especially advantageous use in the formation of a cylindrical sidewall for use with sheet metal drums or similar metal containers.

A related object of the invention is the provision of a forming roll changeover system which may be inexpensively constructed utilizing noncritical and readily fabricated components and which may be conveniently and easily accomplished on an existing standard machine.

It is a more specific object of the invention to provide an improved changeover system for forming rolls which is particularly suitable for use in mass production manufacturing operations.

Other objects and advantages of the invention will become apparent as the following description proceeds, taken in conjunction with the accompanying drawings, in which:

FIGURE 1 is a general side view of a pair of forming rolls embodying the features of the present invention, one of the rolls being shown in vertical cross section and such rolls here being depicted with a sheet metal shell positioned therebetween;

FIG. 2 is an end view of one of the forming rolls shown in FIG. 1;

FIG. 3 is a perspective view of one half of an annular cap used in a roll changeover system in accordance with the present invention;

FIG. 4 is a fragmentary view in perspective of the upper portion of the forming roll constructed in accordance with the present invention, such roll having the annular cap removed;

FIG. 5 is an enlarged fragmentary vertical section of the upper portion of the forming roll shown in FIG. 1;

FIG. 6 is an exploded view similar to FIG. 5, but here showing the annular cap prior to placement on the upper roll disc and in side-by-side relation therewith, thus facilitating comparison of the roll dimensions before and after the cap is applied; and, FIG. 7 is a general side view of a forming roll similar to FIG. 1, but here depicted with the annular caps removed for accommodating smaller diameter shells.

While the invention is susceptible of various modifications and alternative forms, a specific embodiment thereof has been shown by way of example in the drawings which will herein be described in detail. It should be understood, however, that it is not intended to limit the invention to the particular form disclosed, but, on the contrary, the intention is to cover all modifications, equivalents, and alternatives falling within the spirit and scope of the invention as expressed in the appended claims.

Referring to the drawings, and particularly to FIGURE 1, there is illustrated a pair of cooperating forming rolls, generally indicated at 10, 12, respectively, which are particularly suited for pressing the edges of a cylindrical shell 14 having a diameter D into a Z-shaped metal strip 15 incident to performing of a welding operation. The rolls are provided with centrally disposed shafts 16 and 17, respectively, which here serve to support and rotatably drive the rolls in a manner well known to those skilled in the art. In the present instance, each of the rolls is formed of a plurality of contoured discs 18–22 mounted on the shafts. The arrangement is such that the contoured discs form spool-shaped rolls having an upper surface 24 and a lower surface 25 with interconnecting arcuate external surfaces 28, the radii R of which are equal, or substantially equal, to the radius of the shell accommodated by the rolls. In order to provide adequate support for the shell around substantially its entire periphery, the arcuate surfaces 28 converge toward the upper and lower surfaces 24 and 25 and define upper and lower annular flanges 30 and 31, respectively. The radius X of the upper flange is approximately equal to the distance C, between the centerline of the roll and the center of the shell, less one half the width of the Z-bar 15 thereby insuring that the rolls substantially surround the shell when in side-by-side relation, particularly in the region adjacent the Z-shaped strip 15 where the welded seam is to be formed.

It will be apparent to those skilled in the art that the forming rolls, as thus far described, are of the conventional type normally used in conjunction with standard tube or shell forming macrinery. Normally, however, such conventional forming rolls are constructed with substantially equal diameter upper and lower flanges for use with a shell having a radius which corresponds to the radius of the shell engaging surfaces of the rolls. Consequently, if such conventional rolls are utilized when seam welding a container having a radius greater than the roll radius, the container shell will assume a slightly elliptical or "out-of-round" shape. More importantly, however, since the container shell is larger in diameter, the flanges 30 on the adjacent rolls will be more widely spaced apart, thus providing inadequate support for the shell in the region of the weld during the welding operation, thereby tending to promote shell wrinkling during the welding operation and decreasing the strength and integrity of the welded seamed connection. It is for this reason that it has heretofore been necessary to utilize larger rolls when seaming larger containers, thus necessitating equipment stoppage, removal of the smaller rolls, and replacement thereof with larger rolls suitable for use with the larger diameter shells.

In accordance with one of the important aspects of the present invention, provision is made for permitting on-the-job modification of a given set of rolls whereby such set of rolls can be effectively used with a relatively wide range of different shell diameters, while at the same time insuring that adequate peripheral support is provided for the shell, particularly in the region of the seamed connection, irrespective of the diameter of the shell then being seamed. To accomplish this, and in keeping with the illustrative form of the invention, the upper disc 18 of each of the rolls is removed from its supporting shaft and reworked so as to permit selective addition of or removal of separable extension caps which are provided in accordance with the invention for the purpose of modifying the roll configuration to accommodate different shell diameters.

In carrying out the present invention, and as best illustrated in FIG. 1 when initially working with rolls having arcuate surfaces 28 of radius R, and the diameter, D, of shell 14 is substantially equal to 2R, the annular flanges 30 of the upper disks 18 are reduced to a radius Y which is less than X, i.e. the distance between the centerline of the roll and the Z-bar for the given shell diameter D, thus the flanges terminate a predetermined distance away from the Z-bar enabling accommodation of a shell having a diameter D1 which is less than the given diameter D of shell 14. It will be appreciated that any suitable machining operation can be utilized for reducing the radius of flange 30 without departing from the present invention. To facilitate positioning of the extension caps, to be described in more detail below, an annular recess 32 is formed in the upper surface 24 of each disc 18.

Referring to FIGS. 2 and 3, annular caps 33 are fabricated and dimensioned to be separably mounted on the upper surface of the top disc 18 of the rolls. Each of the illustrative caps is formed of two arcuate segments 33a, 33b having apertures 34 formed therein so that the segments can be removably mounted by bolts 35, threadably engaging tapped holes 36 formed in the upper disc 18, while the rolls remain secured in the machine. In order to facilitate positioning and removal of the caps; while the rolls are secured in the machine, a relatively large diameter opening 37 is left in the central portion of the cap. In the exemplary construction, each of the cap segments is secured to the disc 18 with three bolts, thus enabling attachment or removal of an entire annular cap with six bolts, although it will be appreciated that more or fewer bolts could be employed if desired.

Referring to FIGS. 5 and 6 conjointly, it will be observed that the annular caps 33 are provided with flat under surface 32a (which engages the annular recess 32 of the top disc 18) and an annular channel 24a (which mates with the remaining raised upper surface 24 of disc 18). The caps 33 are further provided with radially inwardly extending lips 38 defining arcuate, downwardly extending surfaces 39 having a radius corresponding to that of the surface 28 of the roll discs. Thus, lips 38 of the caps 33 define flanges 30a which are continuations or extensions of the flanges 30. Moreover, such extensions provide substantially continuous peripheral support for the shell 14 particularly in the region adjacent the seamed connection. The diameters of the cap flanges 30a may be varied so as to permit use of rolls of radius R for shells having diameters both larger and smaller than substantially twice the radius of the rolls prior to conversion thereof.

Having in mind the foregoing structural details, a brief description of the typical operation of the forming rolls utilizing the annular caps will serve to facilitate an understanding of the present invention. To this end, reference is first made to FIGURE 1, wherein the forming rolls are shown with the annular caps 33 in position in readiness for pressing the shell edges into the Z-shaped piece 15 preparatory to a welding operation. With the caps in position, as shown, the extension flanges 30a are substantially in engagement with the Z-bar 15. Consequently, the extensions 30a of the caps 33 together with the arcuate surfaces 28 of the discs 18–22 provide adequate support about the periphery of the shell 14 as the latter is fed between the rolls.

It has been found that particularly advantageous results are achieved, for example, when working with an 11¼" diameter shell formed of 24 gauge cold-rolled steel; the pair of rolls have 5⅝" radii and are modified in accordance with the present invention, and the caps are secured to the rolls. Thus, the flanges 30a of the caps can be moved into engagement with the Z-bar to peripherally support the shell. With the caps 33 removed, the same rolls will accommodate a 10¾" diameter shell with the upper flanges 30 being run in tightly against the Z-bar 15. Referring to FIG. 7, it will be noted that when the rolls are utilized for the smaller diameter shell and the rolls are moved together (as indicated by arrows P) to press the ends of the shell into the Z-bar, the shell takes a generally elliptical shape. However, where the differences in diameter between the shells accommodated by the rolls do not vary too greatly, the shell produced will not maintain an out-of-round shape. It will also be appreciated that while cutting the flange 30 to a smaller radius than the given radius X for the roll will be satisfactory for the smaller diameter shells, the rolls would not be suitable for the larger diameter shells because adequate support would not be provided for the shell in the area of the Z-shaped bar and wrinkling would occur especially in lighter metal gauges.

In the preceding discussion, a pair of rolls having a radius R and suitable initially for use with a shell having a diameter substantially equal to 2R are modified by reducing the radius of the upper disc flanges and positioning annular caps thereon to extend the flanges thereby enabling continuous peripheral support for shell diameters equal to, less than and greater than 2R. However, it will be appreciated that the rolls may be modified in accordance with the present invention without reducing the radii of the annular flanges 30, but simply by selective addition or removal of the caps 33, continuous peripheral support will be provided for shells having diameters substantially equal to or greater than 2R.

It will be appreciated from the foregoing that there has herein been disclosed an improved system for converting cooperating forming rolls to accommodate different diameter shells preparatory to a welding operation. The upper disc of each of the rolls is reworked so that the radius of the projecting annular flange of the upper disc is reduced a predetermined amount less than the distance between the centerline of the roll and center of the shell, annular caps are fabricated for the upper disc of each of the rolls so that they may be installed by bolts or the like and the caps are selectively added or removed for respectively increasing or decreasing the diameters of the flanges to enable changeover for larger or smaller diameter shells being welded. The caps can be easily and quickly removed or varying diameter caps can be substituted for forming a variety of differing diameter shells.

The present invention will find particularly advantageous application, but by no means exclusive use, in welding different size shells for container sidewalls normally used in the industry. Moreover, the changeover system in accordance with the present invention provides a relatively low cost adjustment that may be easily accomplished on an existing standard machine and permits a fast method of changeover for different diameter shells with a minimum of machine down time. Additionally, the present system obviates the need of expending long periods of time in order to changeover the forming roll assemblies, and the need for maintaining a supply of varying radii forming rolls which would ordinarily be needed to accommodate different diameter shells being run on a production line.

I claim as my invention:

1. A roll for use in pressing a free edge of a metallic sheet into a Z-shaped strip preparatory to welding the opposite free edges together to form a generally cylindrical shell, said roll being generally spool-like in configuration including opposite end surfaces and an interconnecting arcuate surface having a radius generally corresponding to one-half the diameter of a first shell of given diameter, the junctures between said arcuate surface and said end surfaces, respectively, defining first and second annular flanges, said first flange having a radius a predetermined amount less than the distance between the centerline of the roll and the center of said first shell so as to permit accommodation of a second shell having a diameter smaller than said given diameter shell, means defining an annular removable cap separably mounted on said end surface adjacent said first flange, said cap means having an annular portion defining an enlarged annular flange adapted to encircle said adjacent first flange for increasing the radius of the latter by a predetermined amount, and said annular portion having an arcuate surface forming a continuation of and having a common radius with said inter-connecting arcuate surface for peripherally supporting a shell having a diameter greater than said second shell adjacent said Z-shaped strip.

2. A roll as claimed in claim 1 wherein said cap means comprises at least two arcuate segments.

3. A roll for use in pressing a free edge of a metallic sheet into a Z-shaped strip preparatory to welding the opposite free edges together to form a first generally cylindrical shell, said roll being generally spool-like in configuration including opposite end surfaces and an interconnecting arcuate surface having a radius corresponding to one-half the diameter of said first shell, the junctures between said arcuate surface and said end surfaces, respectively, defining first and second annular flanges and said first flange having a radius reduced a predetermined amount less than the distance between the centerline of said roll and the center of said first shell so that said roll will permit accommodation of a second shell having a diameter smaller than that of said first shell.

4. A roll for use in pressing a free edge of a metallic sheet into a Z-shaped strip preparatory to welding the opposite free edges together to form a generally cylindrical shell, said roll being generally spool-like in configuration including opposite end surfaces and an interconnecting arcuate surface having a radius generally corresponding to one-half the diameter of a first shell of given diameter, the junctures between said arcuate surface and said end surfaces, respectively, defining first and second annular flanges, said first flange adapted to substantially engage said Z-shaped strip with said first shell adjacent said roll, means defining an annular removable cap separably mounted on said end surface adjacent said first flange, said cap means having an annular portion defining an enlarged annular flange adapted to encircle said adjacent first flange for increasing the radius of the latter by a predetermined amount, and said annular portion having an arcuate surface forming a continuation of and having a common radius with said interconnecting arcuate surface for peripherally supporting a shell having a diameter greater than said first shell adjacent said Z-shaped strip.

5. For use in modifying a roll of the type used to press a free edge of a generally cylindrical sheet metal shell into a Z-shaped bar preparatory to welding the open free edges of the shell, said roll being generally spool-like in configuration including opposite end surfaces and an interconnecting arcuate surface, the junctures between said arcuate surface and said end surfaces, respectively, defining first and second annular flanges and said first flange adapted to substantially engage said Z-shaped bar with a first shell having a given diameter, a removable annular cap adapted to be separably mounted on said end surface adjacent said first flange so that said roll will accommodate a shell having a larger diameter than said first diameter, said cap having an annular portion defining an enlarged annular flange adapted to encircle said first flange for increasing the diameter of the latter by a predetermined amount so that said cap flange will substantially engage said Z-shaped bar with said larger diameter shell being accommodated, and said annular portion having an arcuate surface forming a continuation of and having a common radius with said interconnecting surface for providing peripheral support for said larger shell adjacent said Z-shaped bar.

6. A cap as defined in claim 4 wherein said cap comprises at least two arcuate segments.

7. A pair of cooperating forming rolls for pressing the free edges of a metallic sheet into a Z-shaped strip preparatory to welding said edges together to form a generally cylindrical shell, said rolls being generally spool-like in configuration and having opposite end surfaces and interconnecting arcuate surfaces, said arcuate surfaces having radii generally corresponding to one-half of the diameter of a first shell having a given diameter, the junctures between said arcuate surfaces and said end surfaces, respectively, defining cooperable first and second annular flanges, said first flanges each having a radius a predetermined amount less than the distance between the center line of the roll and the center of said given shell so as to permit accommodation of a shell having a diameter smaller than said given diameter shell, means defining annular removable caps separably mounted on each of said end surfaces adjacent said first flanges, each of said cap means having an annular portion defining an enlarged annular flange adapted to encircle said adjacent first flanges for increasing the radius of the latter by a predetermined amount, and said annular portions having an arcuate surface forming a continuation of and having a common radius with said interconnecting arcuate surfaces so as to permit accommodation of shells having diameters greater than the diameter of said smaller shell.

8. A pair of rolls for pressing free edges of a metallic sheet into a Z-shaped strip preparatory to welding the opposite free edges together to form a generally cylindrical shell, said rolls being generally spool-like in configuration including opposite end surfaces and interconnecting arcuate surfaces having radii generally corresponding to one-half the diameter of a shell having a given diameter, the junctures between said arcuate surfaces and said end surfaces, respectively, defining first and second annular flanges, said first flanges adapted to substantially engage said Z-shaped strip with said given diameter shell positioned between said rolls, means defining annular removable caps separably mounted on each of said end surfaces adjacent said first flanges, each of said cap means having an annular portion defining an enlarged annular flange adapted to encircle said adjacent first flange for increasing the diameter of the latter by a predetermined amount so as to permit accommodation of shells having diameters greater than the diameter of said given shell and said annular portions having arcuate surfaces forming a continuation of and having a common radius with said interconnecting arcuate surfaces for peripherally supporting said larger shells.

9. A method of modifying a roll adapted for use in pressing a free edge of a metallic sheet into a Z-shaped strip preparatory to welding the opposite free edges together to form a generally cylindrical shell, said roll being generally spool-like in configuration including opposite end surfaces and an interconnecting arcuate surface having a radius generally corresponding to one-half the diameter of a first shell having a given diameter, and the junctures between said arcuate surface and said end surfaces, respectively, defining first and second annular flanges, said method comprising the steps of reducing the radius of said first flange to permit accommodation of a second shell having a smaller diameter than said given diameter and selectively positioning an annular cap on the end of said roll adjacent the reduced radius, first flange so as to increase the radius of the first flange by a predetermined amount to permit accommodation of shells having diameters greater than the diameter of said second shell.

10. A method of modifying a roll adapted for use in pressing a free edge of a metallic sheet into a Z-shaped strip preparatory to welding the opposite free edges together to form a generally cylindrical shell, said roll being generally spool-like in configuration including opposite end surfaces and an interconnecting arcuate surface having a radius generally corresponding to one-half the diameter of a first shell having a given diameter, the junctures between said arcuate surface and said end surfaces, respectively, defining the first and second annular flanges, and said first flange adapted to substantially engage said Z-shaped strip with said first shell adjacent said roll, said method comprising the step of selectively positioning an annular cap on the end of said roll adjacent first flange so as to increase the radius of the first flange by a predetermined amount to permit accommodation of shells having diameters greater than the diameter of said first shell.

11. The method of modifying a pair of cooperating forming rolls to accommodate varying diameter shells, said rolls including opposite end surfaces and interconnecting arcuate surfaces with radii equal to one-half the diameter of a first shell having a given diameter, the junctures between said arcuate surfaces and said end surfaces terminating in first and second annular flanges, respectively, said method comprising the steps of reducing the diameters of said first flanges to permit accommodation of a second shell having a smaller diameter than said given diameter and selectively positioning annular caps on the ends of said rolls adjacent said reduced diameter flanges so as to increase the diameters of said first flanges by a predetermined amount to permit accommodation of shells having diameters greater than the diameter of said second shell.

12. The method of converting a pair of cooperating forming rolls to accommodate varying diameter shells, said rolls having opposite end surfaces and interconnecting arcuate surfaces with radii equal to one-half the diameter of a first shell having a given diameter, the junctures between said arcuate surfaces and said end surfaces terminating in first and second annular flanges, respectively, said method comprising the steps of reducing the diameters of said first flanges to permit accommodation of the second shell having a smaller diameter than said given diameter, fabricating annular caps being dimensioned to be removably mounted on said roll ends adjacent the first flanges and positioning said annular caps on the ends of said rolls adjacent said first flanges so as to increase the diameters of said first flanges by a predetermined amount to permit accommodation of shells having diameters greater than the diameter of said second shell.

13. The method of converting a pair of cooperating forming rolls for use in pressing free edges of a metallic sheet into a Z-shaped strip preparatory to welding the opposite free edges of the sheet together to form a generally cylindrical shell, said rolls being generally spool-like in configuration and formed of a plurality of contoured disks secured to, respective, central shafts, said disks having arcuate surfaces with radii generally corresponding to one-half of the diameter of a first shell having a given diameter, the arcuate surfaces of the opposite end disks terminating in first and second annular flanges, respectively, and said first flanges adapted to substantially engage said Z-shaped strip with said first shell positioned between said rolls, said method comprising the steps of reducing the diameters of said first flanges by a predetermined amount so as to permit said reduced diameter flanges to substantially engage said Z-shaped strip with a second shell having a diameter less than said given diameter positioned between said rolls and selectively positioning annular segmented caps on the ends of said rolls adjacent said first flanges so as to increase the diameters of said first flanges by a predetermined amount thereby converting said rolls to permit accommodation of shells having diameters greater than the diameter of said second shell without removing said rolls from said shafts.

References Cited

UNITED STATES PATENTS

| 157,654 | 12/1874 | Tasker | 72—182 |
| 2,986,193 | 5/1961 | Howell | 72—177 |
| 3,150,707 | 9/1964 | Howell | 72—177 |

FOREIGN PATENTS 1,015,675  10/1957  Germany.

RICHARD J. HERBST, *Primary Examiner.*

R. D. GREFE, *Assistant Examiner.*